United States Patent Office 2,810,182
Patented Oct. 22, 1957

2,810,182

CERAMIC MOULDING PROCESS

Eric Adolph Brandes, Chalfont St. Peter, England, assignor to Fulmer Research Institute Limited, Stoke Poges, England No Drawing. Application December 11, 1952,
Serial No. 325,435

21 Claims. (Cl. 25—156)

This invention is concerned with making shaped bodies from firable powders (including metallic powders, ceramic or other firable non-metallic powders, and mixtures of both) by pressing or tamping or otherwise shaping and then heating or firing the shaped mass.

It is usually necessary to incorporate with the powder a temporary bonding agent to impart to the shaped body sufficient strength to enable it to be handled until it is heated or fired. Organic substances such as gums or waxes are commonly used for this purpose, but they have the disadvantage that they must be removed by heating the shaped body to a moderate temperature, which treatment is sometimes rather lengthy because the organic substances are often first converted to carbon which may then have to be oxidised away. This means that this part of the heating or firing at least must be carried out under oxidising conditions and this is not always desirable. Another disadvantage is that as the organic matter is removed, voids are created which must subsequently be filled by sintering in order to produce a shaped body of full density.

The basis of the present invention is the novel use as a bonding agent of a particular form of alumina which makes it practically possible to dispense with the use of an organic temporary bond and to avoid its attendant disadvantages.

Gamma alumina is such a form of alumina, more particularly when it is produced as hereinafter described so that it has a plate-like structure because it is then capable of enfolding other particles and of thus producing a shaped body of adequate strength before firing even although the mixture is pressed quite dry. In the absence of any other reaction the gamma alumina on firing is converted to ordinary alpha alumina.

The amount of gamma alumina used for bonding depends on the particular powders to be bonded, but in general at least 20% by weight of gamma alumina is necessary to give strong pressings. Gamma alumina has a density of 3.42 to 3.65, and alpha alumina when fully sintered has a density of 3.9 so that it is possible to calculate the amount of shrinkage which will accompany the conversion of gamma alumina to alpha alumina on firing.

Accordingly, the present invention provides a process of making a unitary body from powder as above defined which comprises mixing the powder with gamma alumina in an amount not less than 20% by weight of the powder, and forming the mixture to shape and firing.

Any type of gamma alumina may be used but it is preferred to produce gamma alumina for the purpose in view by decomposition of a substance of the class ammonia alum or aluminium sulphate. Either of these salts—preferably anhydrous since otherwise water of crystallisation must first be removed—is heated in an open clay vessel under a draught when decomposition occurs. The temperature is held between 900° C. and 1100° C. and preferably at about 1000° C. Below this range, decomposition is too slow and above it gamma alumina begins to change to the alpha form. The mass should be stirred or agitated to allow the $SO_3$ or other volatile products to escape. The reaction proceeds as follows:

$$Al_2(SO_4)_3 = Al_2O_3 + 3SO_3$$

Produced in this way the gamma alumina is fluffy and plate-like in form and is very suitable as a bonding agent.

The gamma alumina may be used as such or together with alpha alumina.

The advantages of the invention are:

(1) No organic substances are required for bonding so that no lengthy removal process and carbon oxidation are necessary.

(2) The pressing or forming or shaping can be carried out substantially dry.

(3) No impurities are introduced (assuming alumina is required to be present).

(4) The firing can be performed in vacuum or under reducing conditions throughout the firing treatment.

Example I

Iron powder, finely divided alpha alumina, and gamma alumina produced as described above are dry mixed in the proportions of 30, 40, 30, respectively, in a mixer. The whole is roughly pressed into bricks and then granulated by rough grinding and passing through a 30 mesh screen. These granulations are then fed to a die for pressing to the shape of the required finished piece. This shaped body can then be fired in vacuum or in a reducing atmosphere. Alternatively, provided that the mixing is adequate, granulation may not be necessary and firing can be conducted on bodies of the shape required made from the mixed powders.

Example II

Alpha alumina is mixed with 30% by weight of gamma alumina produced as described above and the whole pressed into the shape of the required finished piece, suitable allowances being made for the natural shrinkage of the mixture. This is then fired at a temperature of approximately 1600° C. and produces alumina ware consisting entirely of alpha alumina free from the impurities normally introduced with a bond.

Example III

An alloy consisting of approximately 80% nickel, 20% chromium in the form of a powder is dry mixed with 30% of gamma alumina and pressed to shape and is subsequently fired either in a vacuum or in a reducing atmosphere.

Example IV

Fifty-six parts of nickel powder are mixed with 14 parts of chrominum powder, together with 30 parts of gamma alumina and the mixture is pressed to shape and subsequently fired in a vacuum or in a reducing atmosphere.

I claim:

1. A process of making a shaped body from firable powder which comprises mixing with the powder as its bonding agent, gamma alumina in an amount not less than 20% by weight of the powder, forming the mixture to shape, and firing said shaped mixture.

2. A process as set forth in claim 1, including pressing the mixture to any convenient form followed by granulation, forming the granules to the finished shape, and firing in an atmosphere controlled to prevent excessive oxidation.

3. A process as set forth in claim 1, the gamma alumina having a plate-like structure.

4. A process of making a shaped body which comprises mixing with a metallic powder as its bonding agent gamma alumina in an amount not less than 20% by weight of the metallic powder, forming the mixture to shape, and firing said shaped mixture.

5. A process as set forth in claim 4, including pressing the mixture to any convenient form followed by granulation, forming the granules to the finished shape and firing in an atmosphere controlled to prevent excessive oxidation.

6. A process as set forth in claim 4, the gamma alumina having a plate-like structure.

7. A process of making a shaped body which comprises mixing with a firable non-metallic powder as its bonding agent, gamma alumina in an amount not less than 20% by weight of the non-metallic powder, forming the mixture to shape, and firing said shaped mixture.

8. A process as set forth in claim 7, including pressing the mixture to any convenient form followed by granulation, forming the granules to the finished shape and firing in an atmosphere controlled to prevent excessive oxidation.

9. A process as set forth in claim 7, the gamma alumina having a plate-like structure.

10. A process of making a shaped body which comprises incorporating with a mixture of a metallic and a firable non-metallic powder as its bonding agent, gamma alumina in an amount not less than 20% by weight of the said mixture, forming the whole to shape, and firing said shaped whole.

11. A process as set forth in claim 10, the gamma alumina having a plate-like structure.

12. A process of making a shaped body from firable powder which comprises mixing the powder with alumina containing, as the bonding agent for the mixture, gamma alumina in an amount not less than 20% by weight of the powder, forming the mixture to shape, and firing said shaped mixture.

13. A process as set forth in claim 12, the gamma alumina having a plate-like structure.

14. A process of making a shaped body which comprises mixing a metallic powder with alumina containing, as the bonding agent for the mixture, gamma alumina in an amount not less than 20% by weight of the powder, forming the mixture to shape, and firing said shaped mixture.

15. A process of making a shaped body which comprises mixing a non-metallic powder with alumina containing, as the bonding agent for the mixture, gamma alumina in an amount not less than 20% by weight of the powder, and forming the mixture to shape and firing.

16. A process of making a shaped body which comprises incorporating with a mixture of a metallic powder and a firable non-metallic powder, alumina containing, as the bonding agent for the mixture, gamma alumina in an amount not less than 20% by weight of the said mixture, and forming the whole to shape, firing the shaped whole.

17. A process of making a shaped body which comprises mixing iron powder, finely divided alpha alumina, and as the bonding agent gamma alumina the latter in amount not less than 20% by weight of the other constituents together, and forming the mixture to shape and firing.

18. A process as set forth in claim 17, including pressing the mixture to any convenient form followed by granulation to pass through a 30 mesh screen, forming the granules to the finished shape and firing in an atmosphere controlled to prevent excessive oxidation.

19. A process of making a shaped body which comprises mixing with finely divided alpha alumina, as the bonding agent for the mixture, not less than 20% by weight of gamma alumina, forming the mixture to shape, and firing the shaped mixture.

20. A process of making a shaped body which comprises mixing with a powdered alloy of approximately 80% nickel and 20% chromium as its bonding agent, finely divided gamma alumina in an amount not less than 20% by weight of the alloy and forming the mixture to shape and firing.

21. A process of making a shaped body which comprises mixing with nickel powder and chromium powder in the proportion approximately 80% nickel and 20% chromium, as the bonding agent for the powder, finely divided gamma alumina in amount not less than 20% by weight of the nickel and chromium together, and forming the mixture to shape and firing.

References Cited in the file of this patent

UNITED STATES PATENTS

| | | |
|---|---|---|
| 2,478,675 | Tamele | Aug. 9, 1949 |
| 2,568,157 | Lepp | Sept. 18, 1951 |
| 2,629,161 | Kistler | Feb. 24, 1953 |

FOREIGN PATENTS

| | | |
|---|---|---|
| 656,153 | Great Britain | Apr. 6, 1948 |
| 883,630 | France | Mar. 29, 1943 |

OTHER REFERENCES

O. E. Gorbunova and I. I. Vaganova: "X-ray Investigation of the Transformation of γ-Aluminum Oxide into α-Aluminum Oxide," Khimicheskaya Promyshlennot Zhurnal, vol. 2 (5), pp. 31–32 (1939). See Refractories Bibliography, published by American Iron and Steel Institute and the American Ceramic Society, Columbus, Ohio (1950), p. 641d. (Copy in Div. 15.)